US006924626B2

(12) United States Patent
Thiery

(10) Patent No.: US 6,924,626 B2
(45) Date of Patent: Aug. 2, 2005

(54) BOOTSTRAP CAPACITOR CHARGE CIRCUIT WITH LIMITED CHARGE CURRENT

(75) Inventor: Vincent Thiery, Aix en Provence (FR)

(73) Assignee: International Rectifier Corporation, El Segundo, CA (US)

(*) Notice: Subject to any disclaimer, the term of this patent is extended or adjusted under 35 U.S.C. 154(b) by 164 days.

(21) Appl. No.: 10/618,559

(22) Filed: Jul. 10, 2003

(65) Prior Publication Data

US 2005/0007076 A1 Jan. 13, 2005

(51) Int. Cl.$^{7}$ .............................................. H01M 10/44
(52) U.S. Cl. ...................................................... 320/166
(58) Field of Search ................................ 320/127, 128, 320/135, 166; 323/223, 224, 282; 327/538, 589

(56) References Cited

U.S. PATENT DOCUMENTS 6,650,100 B1 * 11/2003 Kohout et al. .............. 323/282
6,714,067 B1 * 3/2004 Farrenkopf ................. 327/589

* cited by examiner

*Primary Examiner*—Edward H. Tso
(74) *Attorney, Agent, or Firm*—Ostrolenk, Faber, Gerb & Soffen, LLP

(57) ABSTRACT

A bootstrap capacitor charging circuit comprising a bootstrap capacitor, a semiconductor switch controlled by a control terminal, the control terminal coupled to a source of charging current for the bootstrap capacitor, the switch having two main terminals, the first main terminal coupled to the source of charging current and the second main terminal coupled to the bootstrap capacitor, and a voltage regulator device having a regulation voltage and coupled to the control terminal of the switch, the switch turning off when a voltage across the capacitor approximately equals the regulation voltage of the voltage regulation device, thereby limiting the charging current into the bootstrap capacitor.

10 Claims, 2 Drawing Sheets

BOOTSTRAP CAPACITOR CHARGE CIRCUIT WITH LIMITED CHARGE CURRENT

BACKGROUND OF THE INVENTION

The present invention relates to a capacitor charging circuit and, in particular, to a bootstrap capacitor charging circuit. Even more particularly, the present invention is related to a bootstrap capacitor charging circuit with limited charging current.

Bootstrap capacitors are often employed in electronic circuits to derive a source of power, usually for circuits that require low level current supplies. Often, the bootstrap power supply is derived from a signal present in the electronic circuit such as a drive signal and charge is stored in a bootstrap capacitor for use in powering another portion of the electronic circuit. Often, the voltage is a different voltage than the main supply voltage of the circuit. FIG. 1 shows a typical prior art bootstrap circuit. An integrated circuit IC has a terminal 10 at which a signal, for example, a pulsating drive or control signal may be present. During the times that a pulse is present, current is supplied through a resistor R and a bootstrap diode DBS to a charge storage capacitor or a bootstrap capacitor, CBS. A zener diode DZ may be employed to limit the voltage which can be developed across CBS and therefore provide a regulated bootstrap voltage source VBS for circuits inside the integrated circuit or external to the integrated circuit. In FIG. 1, the diode DZ is shown inside the integrated circuit, although it may be a separate external component. Similarly, the resistor R and diode DBS may be internal to the IC or may be external as shown. Generally, however, the bootstrap capacitor CBS is an external component because of its size.

A problem with the prior art design is that the bootstrap capacitor CBS charges at all times when the pulse is present on the supply line terminal 10. This may be wasteful of power. Depending on the circuits supplied by CBS, it may not be necessary to charge CBS at all times when a pulse is present on line 10.

SUMMARY OF THE INVENTION

It is therefore an object of the present invention to provide a bootstrap capacitor charge circuit which limits the charge current into the bootstrap capacitor as needed by circuits coupled to the bootstrap capacitor, thereby increasing efficiency and reducing power needs.

The above and other objects are achieved by a bootstrap capacitor charging circuit comprising a bootstrap capacitor, a semiconductor switch controlled by a control terminal, the control terminal coupled to a source of charging current for the bootstrap capacitor, the switch having two main terminals, the first main terminal coupled to the source of charging current and the second main terminal coupled to the bootstrap capacitor; and a voltage regulator device having a regulation voltage and coupled to the control terminal of the switch, the switch turning off when a voltage across the capacitor approximately equals the regulation voltage of the voltage regulation device, thereby limiting the charging current into the bootstrap capacitor.

The objects of the invention are also achieved by a method for charging a bootstrap capacitor comprising providing a charging current for the bootstrap capacitor to a control terminal of a semiconductor switch, and providing the charging current through a conduction path comprising the main terminals of the semiconductor switch to the bootstrap capacitor; turning the switch off to prevent charging current from flowing into the bootstrap capacitor when the bootstrap capacitor has reached a predetermined voltage, and turning the switch on when the voltage of the bootstrap capacitor has fallen below the predetermined voltage.

The invention thus conserves power, and may be particularly useful for the so called "micro-power mode" of operation.

Other objects, features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings in which.

DETAILED DESCRIPTION OF EMBODIMENTS OF THE INVENTION

Figure 1:
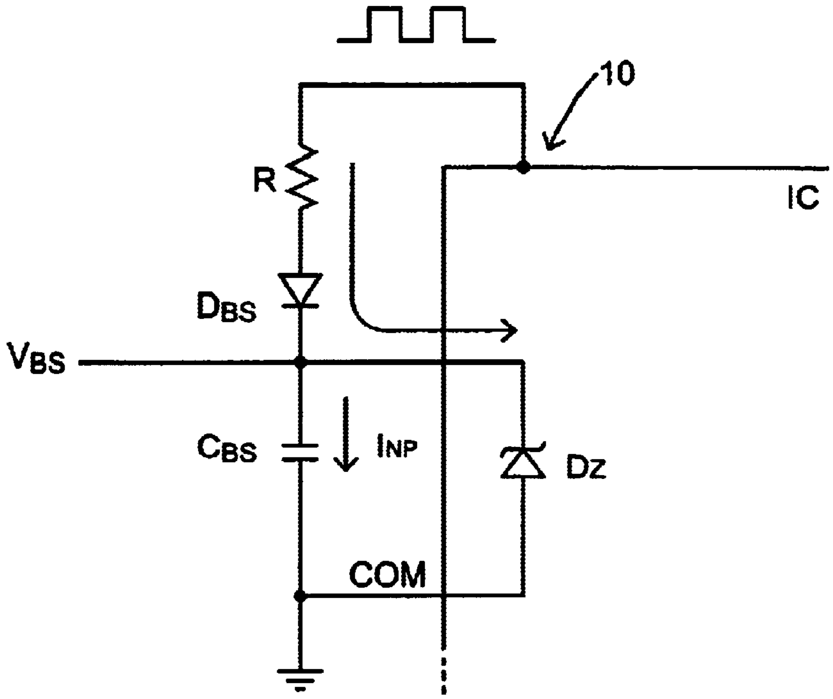
Figure 1 (Prior Art)
FIG. 1 show a prior art bootstrap capacitor charging circuit.
Figure 2:
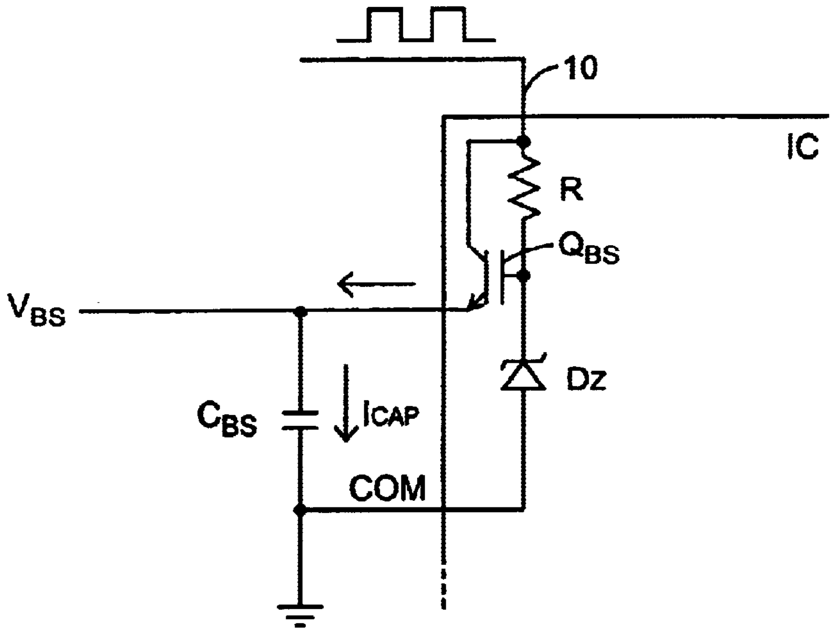
FIG. 2 shows the circuit of the invention.

With reference again to the drawings, FIG. 2 shows a circuit according to the present invention which limits the charging current into the bootstrap capacitor, as needed to reduce power requirements. The circuit according to the invention includes a resistor R, a transistor QBS, a zener diode DZ and the bootstrap capacitor CBS. When a voltage or pulse is present at line 10, current flows through resistor R through zener diode DZ. If the voltage is sufficient, zener diode DZ will avalanche at its zener voltage. Transistor QBS will turn on as soon as the VBE threshold voltage is exceeded, typically 0.7 volts. Current will accordingly flow from terminal 10 through the collector-emitter path of transistor QBS, thereby charging bootstrap capacitor CBS. Depending upon the demands of the electronic circuit powered by bootstrap capacitor CBS, if capacitor CBS charges to the zener voltage of the zener diode DZ, transistor QBS will turn off because the base-emitter voltage is below the threshold to turn on transistor QBS. Should the voltage across capacitor CBS decrease below the zener voltage by the threshold of transistor QBS, transistor QBS will again turn on and current will again flow into capacitor CBS. Accordingly, the charging current into capacitor CBS is limited and current only flows into capacitor CBS as necessary depending upon the load powered by the charge stored in capacitor CBS.

Figure 3:
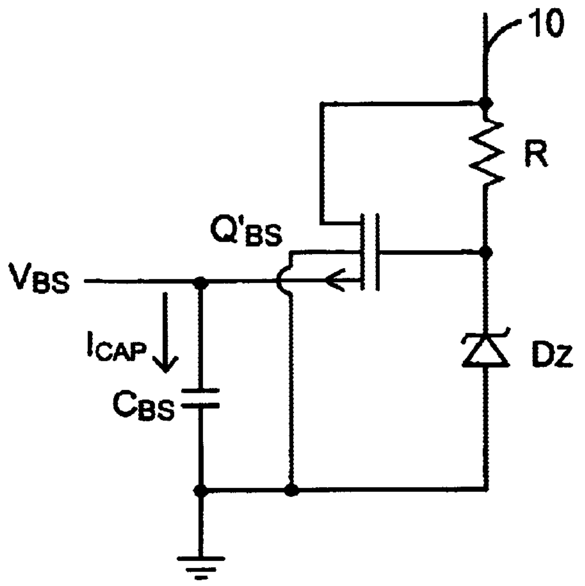
FIG. 3 shows another embodiment of the circuit of the invention.

FIG. 3 shows an alternative embodiment using a MOSFET Q'BS. The circuit operates in substantially the same way. The on threshold voltage of a MOSFET depends upon the bulk or substrate connection and may be large if the substrate is not connected to the source. For example, if the substrate is connected to the source, $V_{TH}$ may be about 1V. If the substrate is not connected to the source, the $V_{TH}$ may be about 3V. Bipolars are not always available and thus the use of a MOSFET may be necessary.

Figure 4:
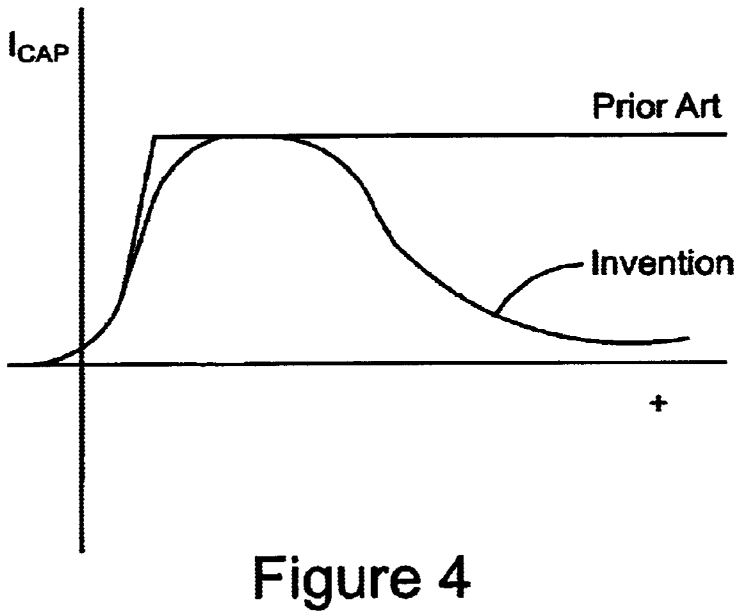
FIG. 4 shows waveforms assisting in explanation of the invention.

FIG. 4 shows a comparison of the operation of the prior art circuit and the circuit of the invention. As shown, in the prior art circuit, the current drawn by the capacitor is constant in the absence of any load and assuming a DC voltage provided at terminal 10. In contrast, with the circuit of the invention, assuming a constant DC voltage at terminal 10 and no load, the capacitor charges and the current through the capacitor reduces once it has reached a voltage approximately equal to the zener diode avalanche voltage.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A bootstrap capacitor charging circuit comprising:

a bootstrap capacitor;

a semiconductor switch controlled by a control terminal, the control terminal coupled to a source of charging current for the bootstrap capacitor, the switch having two main terminals, the first main terminal coupled to the source of charging current and the second main terminal coupled to the bootstrap capacitor; and a voltage regulator device having a regulation voltage and coupled to the control terminal of the switch, the switch turning off when a voltage across the capacitor approximately equals the regulation voltage of the voltage regulation device, thereby limiting the charging current into the bootstrap capacitor.

2. The bootstrap capacitor charging circuit of claim 1, further comprising a dropping resistor coupled between the source of charging current and the control terminal of the semiconductor switch.

3. The bootstrap capacitor charging circuit of claim 1, wherein the voltage regulation device comprises a zener diode.

4. The bootstrap capacitor charging circuit of claim 1, wherein the semiconductor switch comprises a bipolar transistor.

5. The bootstrap capacitor charging circuit of claim 1, wherein the semiconductor switch comprises a MOSFET.

6. The bootstrap capacitor charging circuit of claim 1, wherein the semiconductor switch and zener diode are arranged in an IC.

7. The bootstrap capacitor charging circuit of claim 2, wherein the semiconductor switch, zener diode and resistor are arranged in an IC.

8. A method for charging a bootstrap capacitor comprising:

providing a charging current for the bootstrap capacitor to a control terminal of a semiconductor switch, and providing the charging current through a conduction path comprising the main terminals of the semiconductor switch to the bootstrap capacitor;

turning the switch off to prevent charging current from flowing into the bootstrap capacitor when the bootstrap capacitor has reached a predetermined voltage; and turning the switch on when the voltage of the bootstrap capacitor has fallen below the predetermined voltage.

9. The method of claim 8, wherein the steps of turning the switch off and on are controlled by a voltage regulation device fed with the charging current.

10. The method of claim 8, further comprising turning the switch off to conserve power and operate in a micropower mode.

* * * * *